US007765295B2

(12) United States Patent
Anastas et al.

(10) Patent No.: US 7,765,295 B2
(45) Date of Patent: Jul. 27, 2010

(54) METHODS AND APPARATUS FOR REAL USER MONITORING

(75) Inventors: Paul Anastas, Needham, MA (US); William Ryan Breen, Melrose, MA (US); Yuan Cheng, Needham, MA (US); Allen Lieberman, Natick, MA (US); Imad Mouline, Braintree, MA (US)

(73) Assignee: Compuware Corporation, Detroit, MI (US)

( * ) Notice: Subject to any disclaimer, the term of this patent is extended or adjusted under 35 U.S.C. 154(b) by 0 days.

(21) Appl. No.: 11/877,804

(22) Filed: Oct. 24, 2007

(65) Prior Publication Data
US 2008/0114875 A1    May 15, 2008

Related U.S. Application Data

(60) Provisional application No. 60/854,379, filed on Oct. 25, 2006.

(51) Int. Cl.
*G06F 15/173*    (2006.01)
*G06F 15/177*    (2006.01)
*G06F 9/44*    (2006.01)
*G06F 9/46*    (2006.01)
*G06F 15/16*    (2006.01)
*G06F 3/00*    (2006.01)
*G06F 13/00*    (2006.01)

(52) U.S. Cl. .................. 709/224; 715/736; 715/745
(58) Field of Classification Search .............. 709/203, 709/219, 223, 224; 715/736, 745, 749; 719/318
See application file for complete search history.

(56) References Cited

U.S. PATENT DOCUMENTS

| 5,819,092 | A  | * | 10/1998 | Ferguson et al. ............ 717/113 |
| 6,473,794 | B1 | * | 10/2002 | Guheen et al. .............. 709/223 |
| 6,601,100 | B2 | * | 7/2003  | Lee et al. .................... 709/226 |
| 6,704,732 | B1 | * | 3/2004  | Barclay ....................... 707/10 |
| 6,892,238 | B2 | * | 5/2005  | Lee et al. .................... 709/224 |
| 6,895,437 | B1 | * | 5/2005  | Cowdrey et al. ............ 709/224 |
| 7,003,565 | B2 | * | 2/2006  | Hind et al. .................. 709/224 |
| 7,107,535 | B2 | * | 9/2006  | Cohen et al. ................ 715/736 |
| 7,353,272 | B2 | * | 4/2008  | Robertson et al. ........... 709/224 |
| 7,355,996 | B2 | * | 4/2008  | Hrastar ....................... 370/328 |
| 7,437,451 | B2 | * | 10/2008 | Tang et al. .................. 709/224 |
| 7,447,671 | B2 | * | 11/2008 | Schoenfeld et al. .......... 706/60 |
| 7,526,546 | B2 | * | 4/2009  | Motoyama et al. .......... 709/224 |
| 7,532,895 | B2 | * | 5/2009  | Hrastar .................... 455/456.1 |
| 7,552,212 | B2 | * | 6/2009  | Chagoly et al. ............. 709/224 |

(Continued)

OTHER PUBLICATIONS

International Search Report mailed Sep. 8, 2008 in counterpart International Application No. PCT/US07/82387.

(Continued)

*Primary Examiner*—Vivek Srivastava
*Assistant Examiner*—Melvin H Pollack
(74) *Attorney, Agent, or Firm*—Fenwick & West LLP

(57) ABSTRACT

A system monitors browser operation on a web page to identify objects referenced by the web page. For objects referenced by the web page, the system tracks a performance metric associated with each object. The system performs post-processing on the performance metrics of objects referenced by the web page to create a performance record for that web page, and transfers the performance record to a remote server for analysis of performance of web page operation in the browser.

25 Claims, 11 Drawing Sheets

U.S. PATENT DOCUMENTS

| | | | |
|---|---|---|---|
| 7,574,489 B2* | 8/2009 | Motoyama et al. | 709/219 |
| 7,600,014 B2* | 10/2009 | Russell et al. | 709/224 |
| 2002/0099818 A1* | 7/2002 | Russell et al. | 709/224 |
| 2003/0023712 A1* | 1/2003 | Zhao et al. | 709/223 |
| 2003/0023715 A1* | 1/2003 | Reiner et al. | 709/224 |
| 2003/0065763 A1* | 4/2003 | Swildens et al. | 709/224 |
| 2003/0221000 A1* | 11/2003 | Cherkasova et al. | 709/224 |
| 2004/0073644 A1* | 4/2004 | Koch et al. | 709/223 |
| 2004/0260807 A1* | 12/2004 | Glommen et al. | 709/224 |
| 2005/0027858 A1* | 2/2005 | Sloth et al. | 709/224 |
| 2005/0108391 A1* | 5/2005 | Boss et al. | 709/224 |
| 2006/0085420 A1 | 4/2006 | Hwang | |
| 2007/0174419 A1* | 7/2007 | O'Connell et al. | 709/217 |

OTHER PUBLICATIONS

Supplementary European Search Report, European Patent Application No. EP 07854385.7, Dec. 4, 2009, 8 pages.

\* cited by examiner

214 FOR OBJECTS REFERENCED BY THE WEB PAGE, TRACK A PERFORMANCE METRIC ASSOCIATED WITH EACH OBJECT

215 PARSE THE WEB PAGE TO IDENTIFY OBJECTS SUBJECT TO TRACKING THE PERFORMANCE METRIC

216 IDENTIFY OBJECTS INCLUDING AT LEAST ONE OF:
i) AN IMAGE
ii) A CASCADING STYLE SHEET IDENTIFIER
iii) A PORTION OF EXECUTABLE CODE
iv) A FRAME, OR
v) A USER IDENTIFIED TRACKING TAG

*FIG. 6*

221 FOR OBJECTS REFERENCED BY THE WEB PAGE, TRACK A PERFORMANCE METRIC ASSOCIATED WITH EACH OBJECT

222 FOR EACH OBJECT REFERENCED BY THE WEB PAGE, ADD AN OBJECT HANDLER TO AN INTERFACE THAT ALLOWS ACCESS TO THE OBJECTS ON THE WEB PAGE

223 CREATE AN EVENT STATUS ASSOCIATED WITH THE OBJECT

224 CAPTURE A TIMESTAMP FOR THE EVENT STATUS ASSOCIATED WITH THE OBJECT

225 DETERMINE A STATUS ASSOCIATED WITH THE OBJECT BASED ON AN ANALYSIS OF THE EVENT STATUS AND THE TIMESTAMP, THE STATUS ASSOCIATED THE OBJECT INCLUDING AT LEAST ONE OF:
i) CACHED
ii) BLOCKED
iii) SUCCESSFULLY DOWNLOADED
iv) UNSUCCESSFULLY DOWNLOADED
v) ABORTED

FIG. 8

226 PERFORM POST-PROCESSING ON THE PERFORMANCE METRICS OF OBJECTS REFERENCED BY THE WEB PAGE TO CREATE A PERFORMANCE RECORD FOR THAT WEB PAGE

227 OBTAIN AT LEAST ONE CHARACTERISTIC ASSOCIATED WITH THE COMPUTER SYSTEM ON WHICH THE BROWSER IS IN OPERATION

228 STORE PERFORMANCE COLLECTION INFORMATION ON THE COMPUTER SYSTEM, THE PERFORMANCE COLLECTION INFORMATION INCLUDING AT LEAST ONE OF:
i) THE AT LEAST ONE OBTAINED CHARACTERISTIC ASSOCIATED WITH THE COMPUTER SYSTEM ON WHICH THE BROWSER IS OPERATING
ii) THE PERFORMANCE RECORD

*FIG. 9*

231 PERFORM POST-PROCESSING ON THE PERFORMANCE METRICS OF OBJECTS REFERENCED BY THE WEB PAGE TO CREATE A PERFORMANCE RECORD FOR THAT WEB PAGE

232 CALCULATE A LOAD TIME ASSOCIATED WITH AT LEAST ONE OF:
i) AT LEAST ONE OBJECT ON THE WEB PAGE
ii) THE WEB PAGE

OR

233 DETERMINE AN ACTION PERFORMED BY A USER BASED ON AT LEAST ONE OF:
i) A TIME STAMP ASSOCIATED WITH THE WEB PAGE
ii) AN OBJECT HANDLER ASSOCIATED WITH THE WEB PAGE

OR

234 DETECT THAT AN ERROR OCCURRED ON THE WEB PAGE

235 IDENTIFY A LEVEL OF REPORTING ASSOCIATED WITH MONITORING OF THE WEB PAGE

236 MODIFY THE LEVEL OF REPORTING ASSOCIATED WITH MONITORING OF THE WEB PAGE, BASED ON THE ERROR THAT OCCURRED ON THE WEB PAGE

*FIG. 10*

237 TRANSFER THE PERFORMANCE RECORD TO A REMOTE SERVER FOR ANALYSIS OF PERFORMANCE OF WEB PAGE OPERATION IN THE BROWSER

238 COMPARE AT LEAST ONE CHARACTERISTIC ASSOCIATED WITH THE PERFORMANCE RECORD WITH A THRESHOLD THAT DETERMINES AN ACCEPTABLE PERFORMANCE RECORD

239 DETERMINE THE AT LEAST ONE CHARACTERISTIC ASSOCIATED WITH THE PERFORMANCE RECORD EXCEEDS THE THRESHOLD

240 TRANSMIT AN ALERT TO THE REMOTE SERVER, THE ALERT INDICATING THAT THE PERFORMANCE RECORD EXCEEDS THE THRESHOLD

241 DISCARD THE PERFORMANCE RECORD

*FIG. 11*

METHODS AND APPARATUS FOR REAL USER MONITORING

CLAIM TO BENEFIT OF PROVISIONAL PATENT APPLICATION FILING

This Patent Application claims the benefit of the filing date of U.S. Provisional Application for Patent having U.S. Ser. No. 60/854,379, filed in the United States Patent Office on Oct. 25, 2006 entitled "Systems, Methods and Apparatus For Real User Monitoring". The present application has co-inventorship with this provisional and is assigned to the same Assignee. The entire contents and teachings of this provisional application are hereby incorporated by reference herein.

BACKGROUND

Computer systems coupled to a data communications network, such as the Internet, allow for the exchange of a wide variety of information between users of such computer systems. One popular use of computer networks, such as the Internet, allows users to operate client communications software, known as a web browser, to communicate with remote computer systems, known as web servers, in order to browse web pages on the World Wide Web. The World Wide Web is generally a collection of web server computer systems that each operates web server software that communicates using a number of different data communications protocols and data formats, to allow each user's browser to make web page requests to the web servers. In response to these web page requests, web servers obtain (e.g., from storage, or via dynamic generation) the requested web pages and serve those pages back to each user's web browser for viewing by the user.

A typical web page is written in a markup language, such as the Hypertext Markup Language (HTML), and includes a number of embedded objects referenced by respective Uniform Resource Locators (URLs) within the HTML of a web page. The web page itself is generally referenced by a URL, as well. When a user provides a URL to a web browser of a web page (either by clicking a hyperlink identifying the URL to that web page, or by typing in the URL of the web page), the web browser performs a detailed sequence of processing tasks to obtain that web page. As an example, if the URL of the web page identifies a domain name of a server computer system on the Internet, the web browser must first perform a Domain Name Service (DNS) lookup of the domain name to resolve this alphanumeric name into the Internet Protocol (IP) address of the web server on the Internet that can serve the web page referenced by the URL. Once this DNS lookup is complete, the web browser establishes a connection to the web server (e.g., a Transmission Control Protocol or TCP connection) and uses a Hypertext Transport Protocol (HTTP) to transmit a web page GET request over the connection to the web server. The HTTP GET request contains the URL of the web page to be served by the server. The web server receives this HTTP GET request, obtains or dynamically generates the web page, and returns the web page as HTML to the web browser in an HTTP response message over the connection.

As the web browser receives the HTML for the web page, the HTML of the web page may include many embedded URL's that define other objects within the web page to be obtained by web browser. As an example, a graphic or image embedded within the web page is typically referenced with an embedded URL that specifies a server, and location (i.e., filename and directory path) within the server of that graphic or image. As the web browser encounters objects such as embedded URL's within the web page, the web browser repeats the sequence of processing described above the URL for the web page in order to obtain each embedded object, this can include performing a DNS lookup of the domain name specified in the URL (if that domain name was not previously resolved), establishing a connection to a server, and initiating an HTTP get request to obtain the content associated with the embedded URL. Modern web pages often contain many embedded objects, and URLs, that reference these objects, often specify different server computer systems from which to obtain these objects. As a result, the process of obtaining the complete content associated with a single web page including all embedded objects involves significant processing and communications activities.

Sophisticated web server software systems allow a user to visit the web site using his or her browser in order to perform transactions within the web site such as purchasing goods or services. Other types of transactions might involve navigating through a sequence of web pages to obtain desired content, performing searches for user specified information, and so forth. Depending upon the purpose of the web site, a typical user transaction can involve a user visiting a number of pages and providing user input on those pages. The web server often uses input from one or more pages to produce successive web pages in a given transaction.

Many organizations such as corporations, universities and web-based businesses rely heavily on the ability of their web site to properly perform transactions without errors. Because of the importance of ensuring that such web sites are operating properly, software developers have produced a number of conventional tools to exercise and test a web site and measure the performance of that web site's ability to process user transactions correctly and efficiently.

SUMMARY

Conventional technologies for measuring and testing the performance of web sites by monitoring web pages suffer from a variety of deficiencies. In particular, conventional technologies for monitoring web pages are limited in that conventional technologies do not run applications within the end user's browser, and accurately capture the end user's experience on the web page and gauge performance of web page operation. Conventional technologies are not able to capture the impact or effectiveness of third party content that resides on the web page. Conventional technologies do not scale easily to monitor all pages being served. Additionally, conventional technologies are not able to identify which web pages are subject to monitoring. Web site owners need to know which users (i.e., visitors browsing the web site) are having trouble interacting with the web site, and specifically what those problems are. For example, web site owners need to know if the problems are isolated in a certain geographical area, if the problems are tied to a specific operating system, etc. Failure to diagnose and correct the problems that users encounter on the web site ultimately impacts a user's ability, for example, to do business with a web site.

Embodiments disclosed herein significantly overcome these and other deficiencies and provide a performance monitoring process that monitors web based applications from the end user experience, at or within the user's browser, and provides an accurate perspective of the end user's web experience, thus minimizing the risk of poorly performing web pages. That is, the performance monitoring process is, in one configuration, software code (or a computer configured to operate, or operating such code) such as Javascript code that is embedded into one or more web pages of a web site. When a user visits such a web page of that site with his or her browser, the Javascript that embodies the performance monitoring process is loaded and executes in the browser to track performance metrics and aspects of web page operation within the browser as the user is viewing and/or interacting with the page in which the code is embedded (or that references such code). The performance monitoring process provides alerting, reporting and user analysis metrics based on the performance of the web pages on the web site. The performance monitoring process can, in one configuration, monitor the effectiveness of third party content, an important component of the end user's web experience. The effectiveness of the third party content includes whether the content (such as advertisements) gets delivered to the browser, and how well the third party components perform. The performance monitoring process also allows web page owners to add tags to their web pages that can be deterred by the performance monitoring process upon a trigger of various events that the web page users experience. The data is collected on the user's machine, and then transmitted to a remote server upon certain events associated with the web page, and allows a server receiving such data to gather performance metrics associated with the user session. The performance monitoring process provides the web page owner with data concerning performance aspects of the web page collected from a real user experience.

In one configuration, the performance monitoring process determines whether a given web page that is loading for access by a browser is subject to monitoring, for example, by examining a cookie on the computer system on which the browser is operating. In an example embodiment, the performance monitoring process transmits information within the cookie to a remote server, and waits for a response (indicating whether the browser is subject to monitoring by the performance monitoring process for that page). In another example embodiment, a web page owner creates a filter that the performance monitoring process uses to determine whether the browser is subject to monitoring. The filter may specify, for example, a demographic of a user for which the web page owner wants to capture the user's experience. For example, the web page owner may want to capture the user's experience on a web page for users who live in a large city, or that are frequent customers of a given web site.

The performance monitoring process determines that the web page is subject to monitoring, and monitors a page object model such as a document object model maintained by the browser as the browser parses the web page to identify objects referenced by the web page. The objects may include, for example, an image; cascading style sheet (CSS) identifier, a portion of executable code (such as JavaScript), frame, or a tracking tag inserted into the web page by the web page owner. For each object identified, the performance monitoring process, tracks a performance metric associated with the object, such as a time to complete access to that object. The performance metric is tracked by adding an object handler to an interface (for example, the document object model or DOM) that allows access to the objects on the web page. The performance monitoring process creates an event status, and captures a timestamp for each object identified as the browser populates the DOM for various objects on the page.

Various events occur during as a browser loads a page and the performance monitoring process can detect these events. For example, when the parsing of the web page is complete, the performance monitoring process notifies an object handler, and captures a timestamp associated with the parsing of the web page. The performance monitoring process detects an event status associated with the web page. For example, the event status may indicate whether the web page successfully downloaded, incurred an error, or whether a user exited the web page prior to the completion of the downloading of the web page. Each event can be tracked and timestamps can be associated with such events thus providing a sets of performance metrics for the page.

The performance monitoring process performs post-processing on the performance metrics of objects referenced by the web page, to create a performance record for that web page. Using the event status captured for each object on the web page, along with the timestamp associated with each object, the performance monitoring process calculates the load time for each object. The performance monitoring process also calculates the load time of the web page. The performance monitoring process can also determine an amount of a browser interface that is visible to a user and can determine when all page objects within that region have completed loading. This represents that amount of time from page access to when the user perceives the page is loaded from a visibility standpoint. This information can be stored in the performance record as well.

The performance monitoring process transfers the performance record to a remote server. In an example embodiment, the performance monitoring process compares the performance record with a threshold that determines an acceptable performance record. For example, the performance monitoring process determines that an abnormally large amount of performance records are being transmitted to the remote server. The performance monitoring process transmits an alert to the remote server indicating that the amount of data collected (i.e., the performance records) exceeds the threshold. The performance monitoring process then discards the performance record (that the performance monitoring process originally intended to transmit to the remote server).

Embodiments disclosed herein also include a computer system executing a performance monitoring process that monitors browser operation on a web page to identify objects referenced by the web page. For each object referenced by the web page, the performance monitoring process tracks a performance metric associated with object. The performance monitoring process performs post-processing on the performance metrics of objects referenced by the web page to create a performance record for that web page, and transfers the performance record to a remote server, for analysis of performance of web page operation in the browser.

During an example operation of one embodiment, suppose a web site owner wishes to have performance tracking for a web page. The web site owner inserts tracking tags into the web page. The web site owner also identifies a sampling rate of web pages to track, for example, monitoring the performance of one web page for every one hundred web pages browsed within a specified city. As users (i.e., web site visitors browsing the web site) download that web page, the performance monitoring process determines whether the web page is subject to monitoring (using the sampling rate, etc., identified by the web site owner). Upon determining that the web page is subject to monitoring, the performance monitoring process begins monitoring the browser as the browser is parsing the web page as the web page downloads. The performance monitoring process identifies each object (such as images, CSS identifiers, tracking tags inserted by the web site owner, etc.) on the web page. As each object on the web page is downloaded, the performance monitoring process adds an object handler to a Document Object Model (DOM) associated with the object. The performance monitoring process identifies an event status (such as whether the object is loading, whether the object has incurred an error, finished successfully loading, etc.) associated with each object, and captures a time stamp for each event (e.g., when that object completed loading). The performance monitoring process can also detect the occurrence of tracking tags inserted by the creator of the web page and can associate timers to these as well, thus allowing a web site owner to track when certain parts of a page are encountered. The performance monitoring process performs post processing on the performance metrics, such as creating a timeline of events (such as object loading) and the time duration of those events (using the timestamps). The performance monitoring process creates a performance record from the performance metrics, and transfers the performance record to a remote server where it is then provided to the web site owner.

Other embodiments disclosed herein include any type of computerized device, workstation, handheld or laptop computer, or the like configured with software and/or circuitry (e.g., a processor) to process any or all of the agent operations disclosed herein. In other words, a computerized device or a processor that is programmed or configured to operate in accordance with the system as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a communications interface, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

It is to be understood that the system disclosed herein can be embodied strictly as a software program, as software and hardware, or as hardware alone such as within a processor, or within an operating system or a within a software application and that the agent can execute in any type of computer system. Example embodiments disclosed herein may be implemented within products and/or software applications manufactured by Gomez, Inc. of Lexington, Mass., USA.

BRIEF DESCRIPTION OF THE DRAWINGS

The foregoing and other objects, features and advantages disclosed herein will be apparent from the following more particular description of embodiments disclosed herein, as illustrated in the accompanying drawings and figures in which like reference characters refer to the same parts throughout the different views. The drawings are not necessarily to scale, with emphasis instead being placed upon illustrating the embodiments, principles and concepts disclosed herein.

FIG. 6 illustrates a flowchart of a procedure performed by the system of FIG. 1 when the performance monitoring process tracks a performance metric associated with each object referenced by the web page, according to one embodiment disclosed herein.

FIG. 8 illustrates a flowchart of a procedure performed by the system of FIG. 1 when the performance monitoring process adds an object handler to an interface that allows access to the objects on the web page, according to one embodiment disclosed herein.

FIG. 9 illustrates a flowchart of a procedure performed by the system of FIG. 1 when the performance monitoring process performs post-processing on the performance metrics of objects referenced by the web page to create a performance record for that web page, according to one embodiment disclosed herein.

FIG. 10 illustrates a flowchart of a procedure performed by the system of FIG. 1 when the performance monitoring process performs post-processing on the performance metrics of objects referenced by the web page to create a performance record for that web page, and calculates a load time associated with at least one of an object on the web page, and the web page, according to one embodiment disclosed herein.

FIG. 11 illustrates a flowchart of a procedure performed by the system of FIG. 1 when the performance monitoring process transfers the performance record to a remote server for analysis of performance of web page operation in the browser, according to one embodiment disclosed herein.

DETAILED DESCRIPTION

Figure 1:
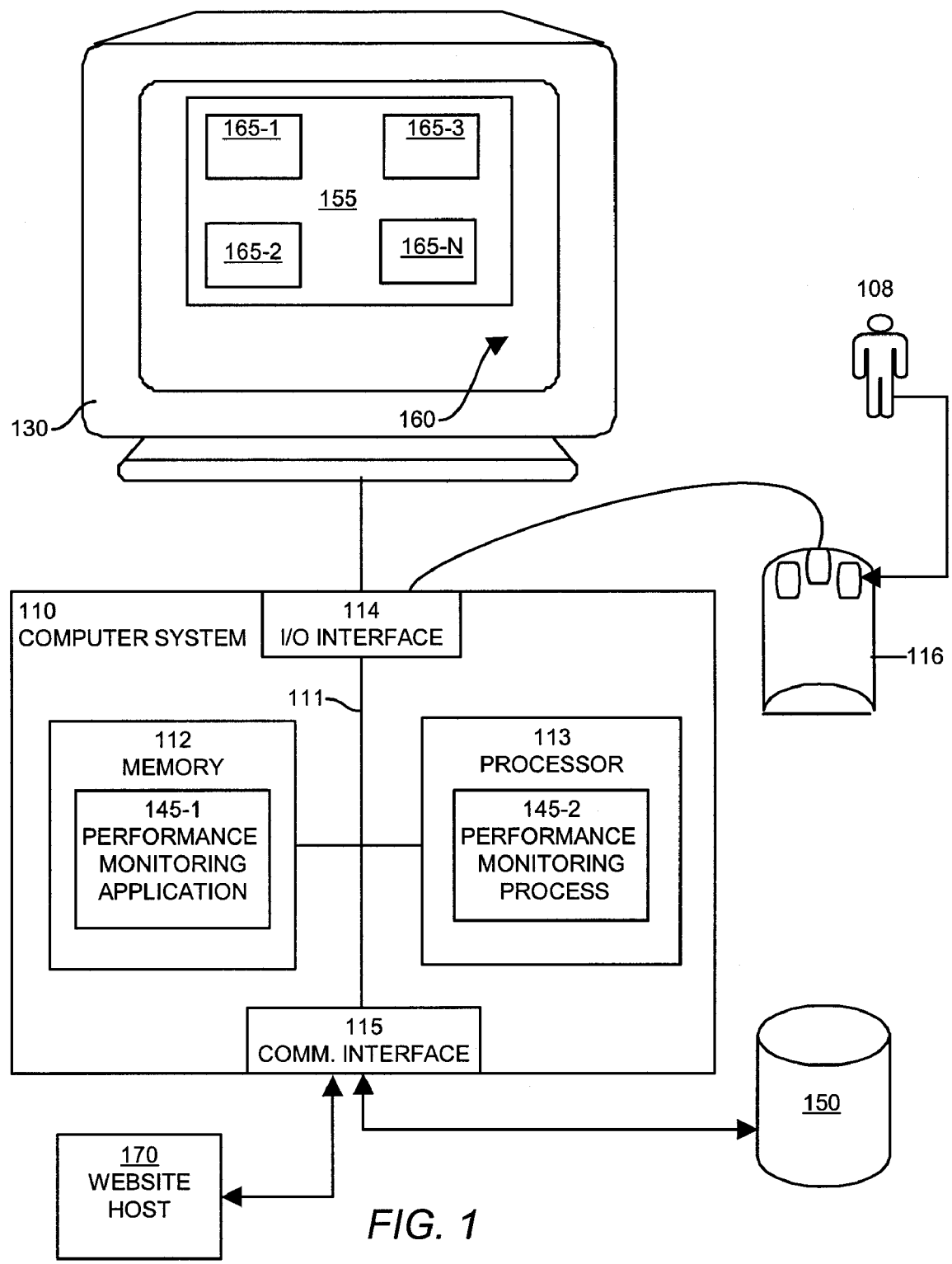
FIG. 1 shows a high-level block diagram of a computer system according to one embodiment disclosed herein.

Embodiments disclosed herein provide a performance monitoring process that monitors web based applications or pages from the end user experience, at the browser, and provides an accurate perspective of the end user's web experience when accessing such web pages, thus minimizing the risk of poorly performing web pages and identifying problems within web pages of web sites. The performance monitoring process provides alerting, reporting and user analysis metrics based on the performance of the web pages on the web site. The performance monitoring process monitors the effectiveness of third party content, an important component of the end user's web experience. The effectiveness of the third party content includes whether the content (such as advertisements) gets delivered to the browser, and how well the third party components perform. The performance monitoring process allows web page owners to add tags to their web pages that trigger the timing of various events that the web page users experience. The data is collected on the user's machine, and then transmitted to a remote server when the user session is completed. The performance monitoring process provides the web page owner with alerts, charts, reports, and data feed capabilities.

Generally, the performance monitoring process can be embodied, for example, as Javascript code embedded or referenced within one or more web pages (e.g. a sequence of web pages that may form a transaction or web-based application). The process can begin executing at the top of the page, when the browser first accesses the page. As the browser loads the rest of the page and as the browser accesses objects (e.g. URLs) referenced within the page, the process disclosed herein can detect such processing and can activate a series of timers, or create timestamps, that track browser processing of the page. This can include capturing timestamps of all object references in a page, as well as timestamps for certain page events including errors, user activity, rendering processing and so forth. The Javascript can interface with the browser to have access to event in a document object model (DOM) that the browser maintains for the content of the page and all objects on the page. Thus for example, when the performance monitoring process detects a new node created in the DOM for an object referenced by the page, the performance monitoring process can create and save a timestamp of this event, and can also detect when the object has completed loading and can create and maintain a timestamp of the completion event as well. Using these timestamps, the performance monitoring process can identify how long it takes to access and then retrieve the object, as well as the location from where the object was retrieved, and other relevant data.

The performance monitoring process can track performance of browser operation on objects such as cascading style sheet tags, images, Javascript tags, frames and the like in this manner. By registering for events associated with the page object and user activity, the performance monitoring process can collect quite detailed information about page performance metrics. Other metrics such as complete page load time, time until a user perceives the page to be loaded (e.g. time to fill the browsers viewable screen area with all object referenced in this area) and other timers can be tracked as well. As the user interacts with a page, such as by selecting a hyperlink in the page, or by pressing the back or forward button of their browser, the performance monitoring process can collect data concerning these events as well. When data is collected, the performance monitoring process can processing this data to produce a performance or summary record of page performance and can then transfer this performance record back to a server for storage and further analysis. The performance monitoring process can operate in various modes of verbosity such that in a summary mode, the performance monitoring process processes most of the timers data captured during browser operation on a page and the summary record is a brief report of page operation. In other modes, more verbose data can be collected and returned to a remote server for detailed off-line analysis. Such verbose modes may be triggered, for example, if the page has an error or other event indicating a condition that might require such detailed analysis. A range of modes can be implemented such as summary, verbose and super-verbose in which all collected data is transferred to the server and very little post processing is performed by the performance monitoring process operating within (or in conjunction with) the browser.

The performance monitoring process can infer certain things form page operation, such as for example, if an image loads very fast, that the image is cached by the browser. Thus during processing of timer data for page objects, the performance monitoring process can provide an indication of percentages and identities of cached objects versus non-cached objects.

FIG. 1 is a block diagram illustrating example architecture of a computer system 110 that executes, runs, interprets, operates or otherwise performs a performance monitoring application 145-1 and process 145-2. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, etc.) couples to processor 113 through I/O interface 114, and enables a user 108 (i.e., a visitor browsing the web page 155) to provide input commands and generally control the graphical user interface 160 that the performance monitoring application 145-1 and process 145-2 provides on the display 130. The graphical user interface 160 displays the content of the web page 155 including the objects 165-1, 165-2, 165-3, and 165-N on the web page 155. The communications interface 115 enables the computer system 110 to communicate with other devices (i.e., other computers) on a network, (not shown). This can allow access to the performance monitoring application by remote computer systems and, in some embodiments, the contents of the container can be obtained from a remote source via the communications interface 115. The communications interface 115 communicates with the remote server 150 (to which the performance record is transmitted), and the web host 170 (from which the web page 155 is downloaded, to the user's 108 computer system 110).

The memory system 112 is any type of computer readable medium and, in this example, is encoded with a performance monitoring application 145-1. The performance monitoring application 145-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112, via the interconnect 111, in order to launch, run, execute, interpret or otherwise perform the logic instructions of the performance monitoring application 145-1. Execution of performance monitoring application 145-1 in this manner produces processing functionality in a performance monitoring process 145-2. In other words, the performance monitoring process 145-2 represents one or more portions of runtime instances of the performance monitoring application 145-1 (or the entire application 145-1) performing or executing within or upon the processor 113 in the computer system 110 at runtime.

It is noted that example configurations disclosed herein include the performance monitoring application 145-1. The performance monitoring application 145-1 may be stored on a computer readable medium (such as a floppy disk), hard disk, electronic, magnetic, and optical or other computer readable medium. The performance monitoring application 145-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the performance monitoring application 145-1 in the processor 113 as the performance monitoring process 145-2. Those skilled in the art will understand that the computer system 110 may include other processes and/or software and hardware components, such as an operating system not shown in this example.

A display 130 need not be coupled directly to computer system 110. For example, the performance monitoring application 145-1 can be executed on a remotely accessible computerized device via the network interface 115. In this instance, the graphical user interface 160 may be displayed locally to a user of the remote computer and execution of the processing herein may be client-server based.

Figure 2:
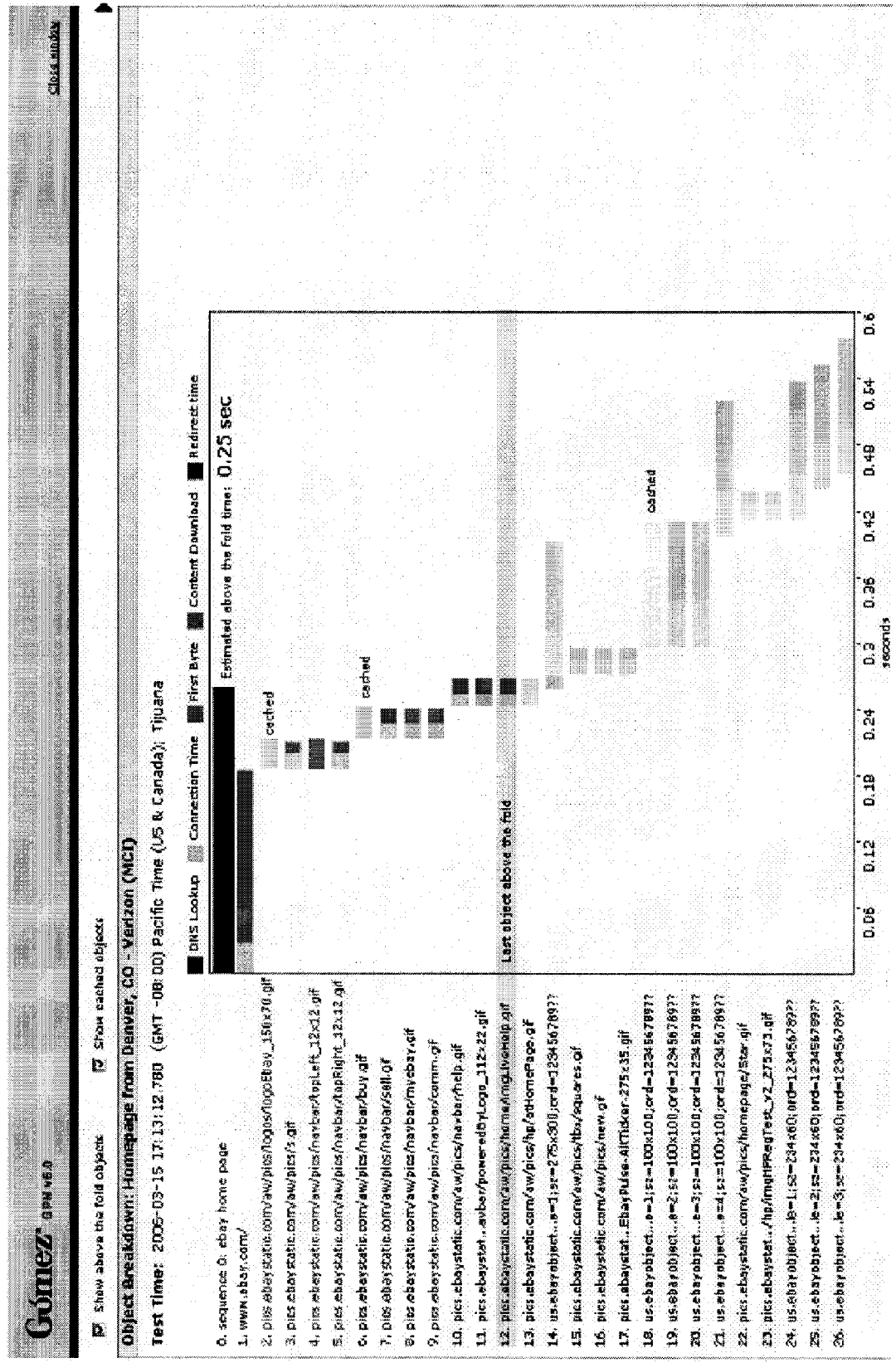
FIG. 2 illustrates an example screenshot of a report produced by the performance monitoring process, and provided to a web site owner by the system of FIG. 1.

FIG. 2 is a screen shot an example report provided data collected by the performance monitoring process 145-2 and sent to a remote server that can analyze this data. The example report illustrates an example timeline of which objects 165-N loaded, and the order in which the objects 165-N loaded. This screenshot illustrates that level of detail concerning object data collection that the performance monitoring process 145-2 affords.

Further details of configurations explained herein will now be provided with respect to a flow chart of processing steps that show the high level operations disclosed herein. Unless otherwise stated, the steps described below are unordered meaning that, when possible, the steps can be performed in any convenient or desirable order.

Figure 3:
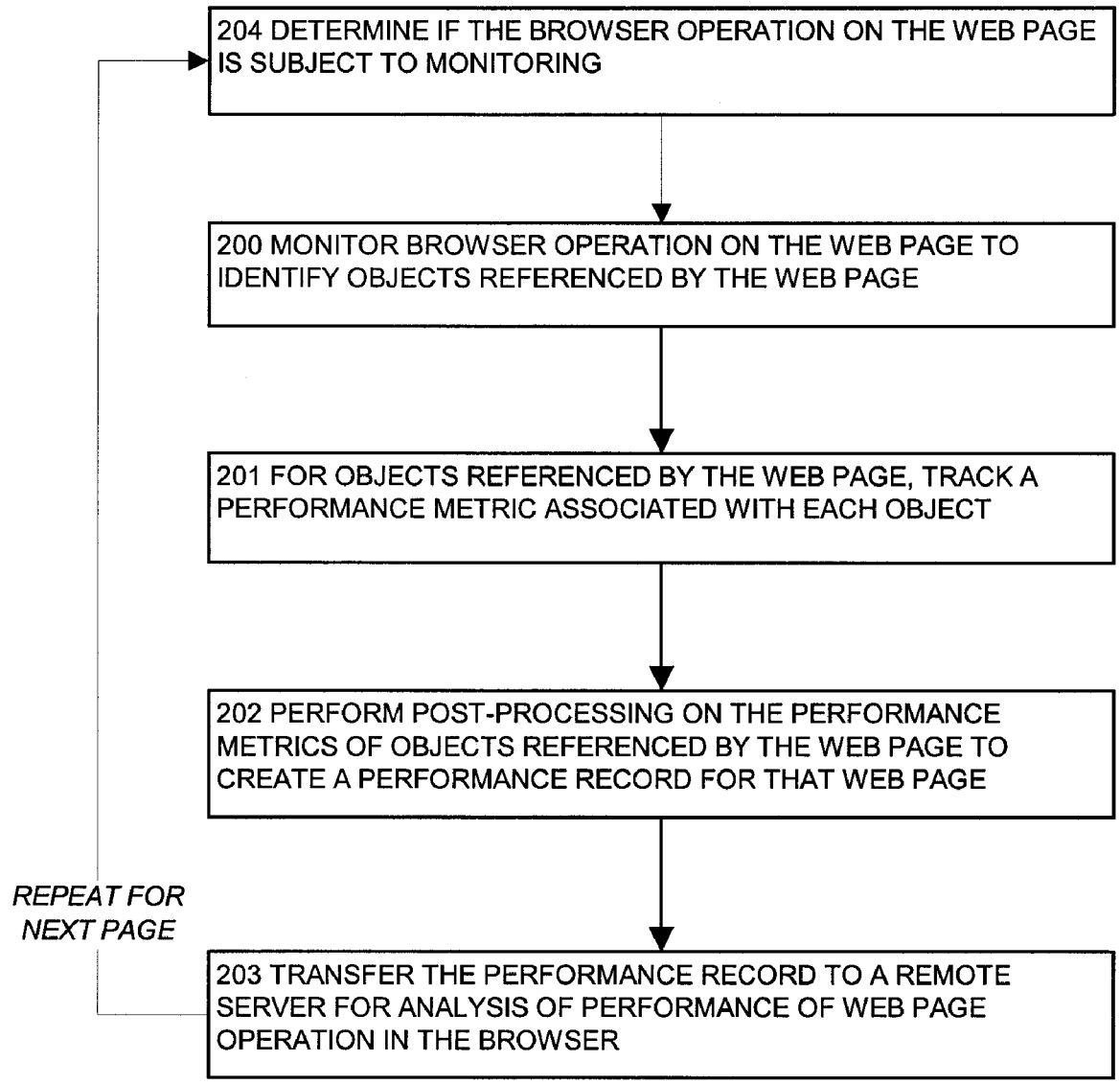
FIG. 3 illustrates a flowchart of a procedure performed by the system of FIG. 1 when the performance monitoring process monitors browser operation on the web page to identify objects referenced by the web page, according to one embodiment disclosed herein.

FIG. 3 is a flowchart of the steps performed by the performance monitoring process 145-2 when it monitors browser operation on the web page 155 to identify objects 165-N referenced by the web page 155.

In step 204, the performance monitoring process 145-2 determines if the browser operation on the web page 155 is subject to monitoring. A web site owner, employing the performance monitoring process 145-2, may desire to capture web page 155 performance associated with a particular demographic of users 108 who visit the web page 155 (for example, users 108 from a specific city). The web site owner may specify, for example, that web page 155 performance should be captured at a specified sampling rate, etc. To make this determination, the performance monitoring process 145-2 may look for a cookie placed in the browser cookie area by the server when the user formerly visited the page. Alternatively, the performance monitoring process 145-2 may transmit a message to the remote server 150 to determine if the page is to be subject to monitoring and to determine the level of monitoring to be performed (e.g. verbose, summary, super-verbose, etc.).

In step 200, the performance monitoring process 145-2 monitors browser operation on the web page 155 to identify objects 165-N referenced by the web page 155. In an example embodiment, the web site owner embeds JavaScript code into the web page 155 to track the objects 165-N on the web page 155. The JavaScript is executed within the browser rendering the web page 155, preferably as the initial operation that the browser performs on the page. In an example embodiment, the JavaScript code is deployed via a library of code containing all execution logic and presenting necessary interfaces. The library is deployed as an obfuscated block of JavaScript stored in a separate JavaScript file, and referenced via a script tag. In another example embodiment, JavaScript code is deployed via a control block that sets any parameters, such as unique identifiers for an account or web page 155, and calls the main initialization routine of the tag. A web site owner may have an account with a provider of the performance monitoring process 145-2. The account may specify, for example, the number of web pages 155 that can be monitored. In an example embodiment, a web site owner subscribes to a level of services performed by the performance monitoring process 145-2, and pays a fee according to the level of services provided by the performance monitoring process 145-2. The performance monitoring process 145-2 is thus loaded and executed by the browser and can monitor operation of browser activity and processing (including user interaction) of that web page.

In step 201, For objects 165-N referenced by the web page 155, in step 201, the performance monitoring process 145-2 tracks a performance metric associated with each object 165-1. In an example embodiment, as each object 165-1 loads on the web page 155, the performance monitoring process 145-2 tracks each event associated with the object 165-1, and captures a timestamp to time each event that occurs with the object 165-1. This may be done, for example, by interfacing with browser APIs that allow the performance monitoring process 145-2 to view DOM activity of the page regarding objects. Other interfaces of the browser may be accessed to detect user activity, errors or other events. In this manner, the performance monitoring process 145-2 can capture a detailed time-based record of page operation within the browser.

In step 202, the performance monitoring process 145-2 performs post-processing on the performance metrics of objects 165-N referenced by the web page 155 to create a performance record for that web page 155. The performance record includes information such as the time to load the web page 155, the time to load each object 165-1 on the web page 155, what actions a user 108 (i.e., a visitor to the web page 155) took either during, or after the web page 155 loading, etc. Post-processing may reduce the amount of data that is sent by the performance monitoring process 145-2 to a remote server 150. In some cases however, the performance monitoring process 145-2 may operate in verbose mode (such as when a web site owner wants fully detailed data on page operation sent to the server 150) and the post-processing may not significantly reduce the amount of data collected and then transferred.

In step 203, the performance monitoring process 145-2 transfers the performance record to a remote server 150 for analysis of performance of web page operation in the browser. Upon creation of the performance record, the performance monitoring process 145-2 transfers the performance record to a remote server 150. A provider of the performance monitoring process 145-2 provides the web site owner with an analysis of the performance of the web page 155. Reports such as that shown in FIG. 2 can be produced by the remote server 150.

Figure 4:
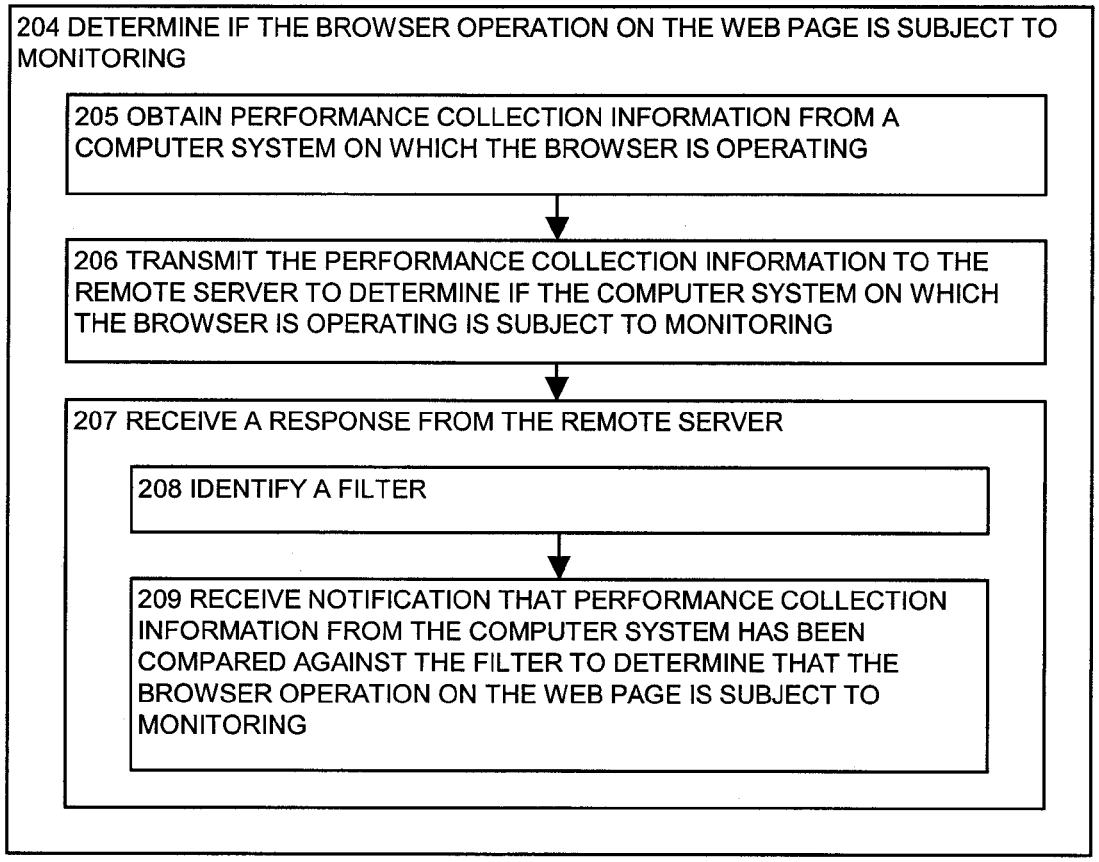
FIG. 4 illustrates a flowchart of a procedure performed by the system of FIG. 1 when the performance monitoring process determines if the browser operation on the web page is subject to monitoring, according to one embodiment disclosed herein.
Figure 5:
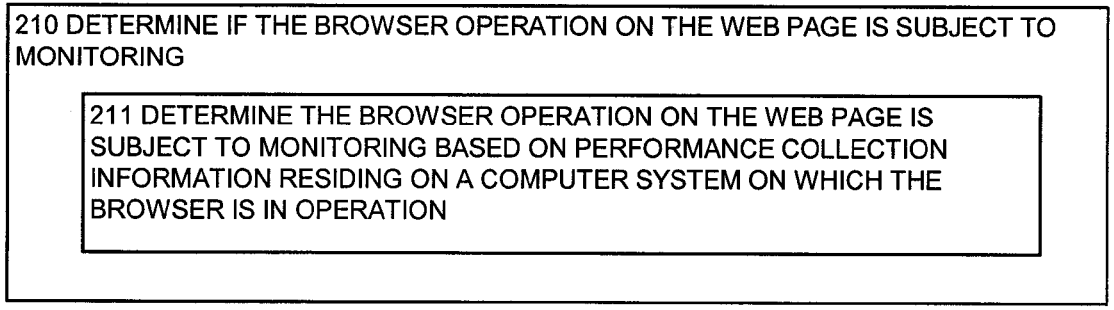
FIG. 5 illustrates a flowchart of a procedure performed by the system of FIG. 1 when the performance monitoring process determines the browser operation on the web page is subject to monitoring, based on performance collection information residing on a computer system on which the browser is in operation, according to one embodiment disclosed herein.

FIGS. 4 and 5 are flowcharts of alternate embodiments of processing of step 204 in FIG. 3 performed by the performance monitoring process 145-2 to determine in browser operation on a page is to be subject to monitoring, and how much detailed is to be collected and processed for shipment to the server 150.

In the embodiment in FIG. 4, in step 205, the performance monitoring process 145-2 obtains performance collection information, such as a cookie, from a computer system 110 on which the browser is operating. In an example embodiment, a cookie, containing the performance collection information, is stored on a user's 108 computer system 110. The cookie provides information as to whether monitoring should be performed on a web page 155 that the user 108 is visiting.

In step 206, the performance monitoring process 145-2 transmits the performance collection information to the remote server 150 to determine if the computer system 110 on which the browser is operating is subject to monitoring. In an example embodiment, the performance monitoring process 145-2 obtains information from the cookie stored on the user's 108 computer system 110 on which the browser is operating and transmits the cookie information to the remote server 150, and waits for a response from the remote server 150.

In step 207, the performance monitoring process 145-2 receives a response from the remote server 150. The remote server 150 transmits a response to the performance monitoring process 145-2, indicating whether the browser operation (i.e. access to a page associated with the cookie) is subject to monitoring. In one example embodiment, the performance monitoring process 145-2 receives a 'Yes' or 'No' response from the remote server 150. In another example embodiment, the performance monitoring process 145-2 receives additional information from the remote server 150, such as level of information to collect (i.e., 'Summary', 'Brief', 'Super Verbose', etc.) during the monitoring of the web page 155.

In step 208, the performance monitoring process 145-2 identifies a filter. In an example embodiment, a web site owner identifies a sampling rate, demographic, etc., indicating whether the browser operation is subject to monitoring and what level of monitoring is to be done. The filter specifies, for example, a verbosity of monitoring and if this particular user is to be monitored. The web site owner may create a filter, for example, having a sampling rate of monitoring one out of every one hundred times the web page 155 is downloaded, within a demographic of a specified zip code.

In step 209, the performance monitoring process 145-2 receives notification that performance collection information from the computer system 110 has been compared against the filter to determine that the browser operation on the web page is subject to monitoring. The performance monitoring process 145-2 receives notification to monitor the browser operation, and begins to monitor the performance the web page 155.

FIG. 5 is an alternative flowchart of the steps performed by the performance monitoring process 145-2 to determines, in step 204 in FIG. 3, if the browser operation on the web page 155 is subject to monitoring.

In step 210, the performance monitoring process 145-2 determines if the browser operation on the web page 155 is subject to monitoring. A web site owner, employing the performance monitoring process 145-2, may desire to capture web page 155 performance associated with a particular demographic of users 108 who visit the web page 155. The web site owner may specify, for example, that web page 155 performance should be captured at a specified sampling rate, etc. A web site owner may subscribe to a specified amount of web page 155 monitoring, and once that quota has been exceeded, the web page 155 is no longer subject to monitoring until the web site owner increases/renews the subscription amount.

In step 211, the performance monitoring process 145-2 determines the browser operation on the web page 155 is subject to monitoring based on performance collection information residing on a computer system 110 on which the browser is in operation. In an example embodiment, a cookie residing on the computer system 110 (on which the browser is operating) indicates that the browser operation on the web page 155 is subject to monitoring. In this alternate configuration then, no communication with a remote machine or server is required and the page itself, or a local cookie, can contain the indication if the page is to be subject to monitoring.

Figure 7:
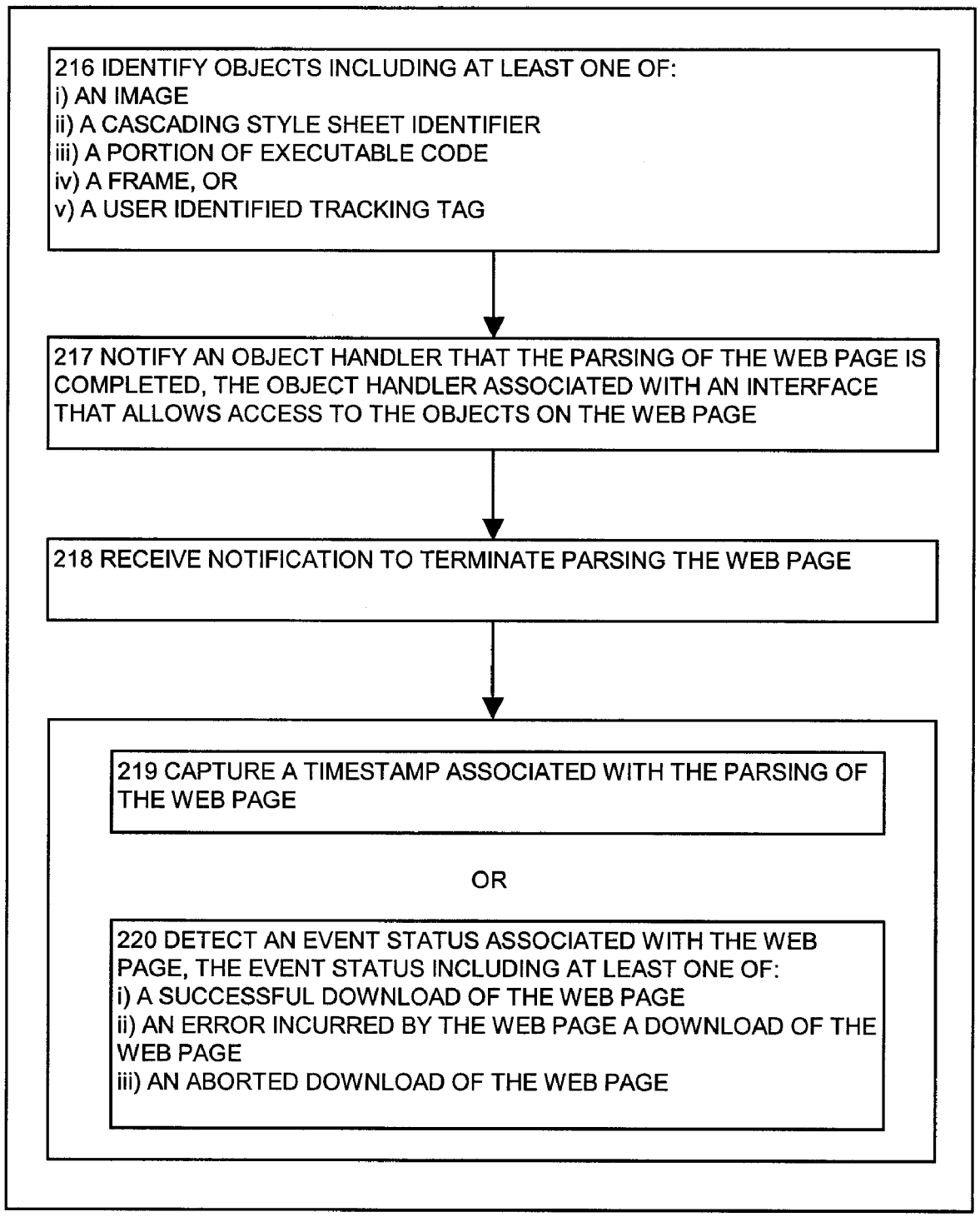
FIG. 7 illustrates a flowchart of a procedure performed by the system of FIG. 1 when the performance monitoring process identifies objects including at least one of an image, a cascading style sheet identifier, a portion of executable code, a frame, or a user identified tracking tag, according to one embodiment disclosed herein.

FIGS. 6, 7 and 8 are flowcharts of the various steps and embodiments performed by the performance monitoring process 145-2 when it tracks a performance metric associated with each object 165-1, generally as shown in FIG. 3.

For objects referenced by the web page 155, in step 214, the performance monitoring process 145-2 tracks performance metric(s) associated with each object 165-1. The performance metric includes whether the object 165-1 loaded successfully, the time to load the object 165-1, whether the object 165-1 was 'above the fold' (meaning whether the object 165-1 is visible to the user 108, given the screen resolution and size of the computer system 110 on which the browser is operating), etc.

In step 215, the performance monitoring process 145-2 watches browser operation as the browser parses the web page 155 to identify objects 165-N subject to tracking the performance metric. In an example embodiment, the performance monitoring process 145-2 begins polling the DOM of the browser that maintains the web page 155 to identify those objects 165-N that are subject to tracking.

In step 216, the performance monitoring process 145-2 identifies the objects 165-N which may be, for example:
   i) an image,
   ii) a cascading style sheet identifier or tag,
   iii) a portion of executable code (such as JavaScript code),
   iv) a frame, or
   v) a user (i.e., a web site owner) identified tracking tag.

This can be done, for example, by registering for events associated with the DOM maintained by the browser for a page that is being accessed. As the browser encounters object references on a page, the browser creates new nodes in the DOM and the performance monitoring process 145-2 can identify these and capture a timestamp of node creation. Then, as those objects are obtained (e.g. from remote servers) and their data is put into the DOM, events associated with browser processing to complete this can be detected or sent to the performance monitoring process 145-2 which can save a timestamp for this completion (or failure or error event) associated with each object.

In an example embodiment, the web site owner may insert a tag into the web page 155 to track the performance of a portion of the web page 155. The performance monitoring process 145-2 provides a web site owner with the capability to insert user-defined tags into the web page 155 to track the performance of a portion of the web page 155. In other words, the web site owner can specify specific sections of the web page 155 on which to track performance by tagging those portions with tags that the performance monitoring process 145-2 is coded to recognize. In an example embodiment, the user identified tracking tag comprises a JavaScript object containing, but not limited to, functional groups, such as event tracking, data collection, state management, and communication.

FIG. 7 is a flowchart of a continuation of FIG. 6 of the steps performed by the performance monitoring process 145-2 when it identifies objects 165-N such as an image, a cascading style sheet identifier, a portion of executable code, a frame, or a user identified tracking tag.

In step 217, the performance monitoring process 145-2 notifies an object handler that the parsing of the web page 155 is completed. The object handler is associated with an interface that allows access to the objects 165-N on the web page 155. In an example embodiment, the object handler is associated with the browser Document Object Model (DOM).

In step 218, the performance monitoring process 145-2 receives notification to terminate parsing the web page 155. In other words, the performance monitoring process 145-2 can identify when the DOM is complete, and/or can detect a page event has caused the browser to stop loading the page (e.g. the user pressed the stop button). Upon completion monitoring the web page 155 for all of the objects 165-N identified in the web page 155, the performance monitoring process 145-2 receives notification to cease the parsing of the web page 155. In an example embodiment, notification to terminate the parsing of the web page 155 also triggers the performance monitoring process 145-2 to transmit the performance record (i.e., those performance metrics have been captured thus far) to the remote server 150.

In step 219, the performance monitoring process 145-2 captures a timestamp associated with the parsing of the web page 155. The performance monitoring process 145-2 captures a timestamp to determine the time duration for the loading of the web page 155. The timestamp may also be used to determine 'user think time', i.e., an amount of time a user 108 spent on the web page 155 before exiting the web page 155 (or moving to a new web page 155). In an example embodiment, the performance monitoring process 145-2 captures a 'perceived web page load time'. The performance monitoring process 145-2 obtains the browser window size from a cookie or other data (e.g. from an API to the browser) stored on the computer system 110 on which the performance monitoring process 145-2 is operating. The performance monitoring process 145-2 determines those objects 165-N on the web page 155 that are displayed within the browser window, and determines when each of those objects 165-N have loaded. From the timestamps associated with the loading of those objects 165-N, the performance monitoring process 145-2 calculates the time duration for the web page 155 to load to the point that the user 108 perceives the web page 155 as being fully rendered within the browser window, even though other object on the page (that would be displayed if the user scrolled down) are not yet fully loaded. In this manner, the system can identify a time from initial page access to a time when the user visually perceives the page to be loaded, but for which at least one non-visible object on the page is/are not fully loaded.

In step 220, the performance monitoring process 145-2 detects an event status associated with the web page 155. The event status may include at least one of:
 i) a successful download of the web page 155,
 ii) an error incurred by the web page 155,
 iii) a download of the web page 155, and
 iv) an aborted download of the web page (i.e., a user 108 may exit the web page 155 before the web page 155 has completed downloading).

FIG. 8 is a flowchart of more detailed steps performed by the performance monitoring process 145-2 when it tracks a performance metric associated with each object 165-N.

For objects 165-N referenced by the web page 155, in step 221, the performance monitoring process 145-2 tracks a performance metric associated with each object 165-N. In an example embodiment, as each object 165-1 loads on the web page 155, the performance monitoring process 145-2 tracks each event associated with the object 165-1, and captures a timestamp to time each event that occurs with the object 165-1

For each object 165-N referenced by the web page 155, in step 222, the performance monitoring process 145-2 adds an object handler to an interface that allows access to the objects on the web page 155. For example, the performance monitoring process 145-2 adds an "Onload", OnError" or "OnAbort" object handler to a Document Object Model (DOM). The "Onload" handler indicates the object 165-1 successfully completed the download. The "OnError" handler indicates an error occurred, and the "OnAbort" object handler indicates a user 108 aborted the download of the object 165-1 (and the web page 155) before the object 165-1 completed downloading. For example, the user 108 may exit the web page 155 before the web page 155 finishes downloading.

In step 223, the performance monitoring process 145-2 creates an event status associated with the object 165-N. When the performance monitoring process 145-2 adds an object handler to the DOM, the performance monitoring process 145-2 creates an event status indicating the status of the object 165-1.

In step 224, the performance monitoring process 145-2 captures a timestamp for the event status associated with the object 165-1. When the performance monitoring process 145-2 adds an object handler to the DOM, the performance monitoring process 145-2 creates an event status, and a timestamp associated with that event status.

In step 225, the performance monitoring process 145-2 determines a status associated with the object based on an analysis of the event status and the timestamp. The status associated the object may include at least one of:
 i) cached,
 ii) blocked,
 iii) successfully downloaded,
 iv) unsuccessfully downloaded, or
 v) aborted.

In an example embodiment, the performance monitoring process 145-2 analyses the event status (for example successfully downloaded) and the time stamp (for example, below a predefined threshold) for an object 165-1. The performance monitoring process 145-2 then determines that, due to the fast rate at which the object 165-1 successfully downloaded (below the predefined threshold), the object 165-1 was previously cached.

FIG. 9 is a flowchart of the steps performed by the performance monitoring process 145-2 when it performs post-processing on the performance metrics of objects 165-N referenced by the web page 155 to create a performance record for that web page 155. In one configuration, after all objects have been loaded on the page, post processing on the collected time data for those objects can be performed to produce the performance record which can then be sent to the remote server 150. This can be done, for example, after the page and its objects are loaded, but before (or while) the user interacts with the page. Thus in one configuration, the performance record containing a summary of timers associated with the page can be computed and sent to the remote server, even though the page is still loaded and the user may be interacting with the page. After the user completes interaction, a second transmission to the remote server 150 can be done to send final data concerning the page, such as how long the user viewed the page, what user action occurred to cause the page to be unloaded (e.g. clicking a link to a new page, exiting the browser, pressing :BACK" and so forth. In another configuration, post processing is done after the final user action is completed with the page and only a single performance record is sent to the remote server 150.

In step 226, the performance monitoring process 145-2 performs post-processing on the performance metrics of objects 165-N referenced by the web page 155 to create a performance record for that web page 155. In this manner, the full details of page data are processing locally by the performance monitoring process 145-2 instead of the remote server 150 having to process all data collected by the performance monitoring process 145-2. The performance record includes information such as the time to load the web page 155, the time to load each object 165-1 on the web page 155, what actions a user 108 took during the web page 155 loading, etc. The performance monitoring process 145-2 analyzes, and summarizes the performance metrics to collect, for example, numerical counts of successful, visible, blocked, and cached objects 165-N on the web page 155. Perceived load time for the web page 155 is measured as the last load, error, or abort time for an object 165-1 that is above the fold (i.e. part of the web page 155 visible to the user 108 without scrolling).

In step 227, the performance monitoring process 145-2 obtains at least one characteristic associated with the computer system 110 on which the browser is in operation. For example, the performance monitoring process 145-2 determines the Operating System on which the browser is operating, the screen resolution of the computer system 110, etc.

In step 228, the performance monitoring process 145-2 stores performance collection information on the computer system 110. The performance collection information can include one or more of the following:

i) at least one obtained characteristic associated with the computer system 110 on which the browser is operating, and
 ii) the performance record.

In an example embodiment, the performance monitoring process 145-2 collects information associated with the computer system 110 on which the browser is operating (such as Operating System, screen resolution, browser type, etc.), the performance record, etc., and stores this information in a cookie or in memory on the computer system 110. This performance record can then be transferred back to the remote server 150, but the user may still be viewing or may not have yet interacted with the page.

FIG. 10 is a flowchart of the steps performed by the performance monitoring process 145-2 when it performs post-processing on the performance metrics of objects 165-N referenced by the web page 155, to create a performance record for that web page 155 after the page is to be removed from the browser and after the user interaction with the page is complete. Note this embodiments disclosed herein are not limited to sending a first performance record upon page loading, and then a second after user activity is complete and the page is being removed from memory by the browser. In one configuration, all post-processing can be done at the very end of a page unload, when the browser is moving on to the next page.

In step 231, the performance monitoring process 145-2 performs post-processing on the performance metrics of objects 165-N referenced by the web page 155 to create a performance record for that web page 155. The performance record includes information such as the time to load the web page 155, the time to load each object 165-1 on the web page 155, what actions a user 108 took either during, or after the web page 155 loading, etc. In an example embodiment, the performance record includes information such as traffic level changes (i.e., higher or lower than expected), performance level changes (i.e., higher response times) and/or availability level changes (i.e., decreases in the percentage or trends of availability).

In step 232, the performance monitoring process 145-2 calculates a load time associated with at least one of:

i) at least one object 165-1 on the web page 155, or
 ii) the web page 155.

During the loading of the web page 155 and each of the objects 165-N, the performance monitoring process 145-2 captures an event status and a timestamp. Using the timestamps, the performance monitoring process 145-2 determines the load time for each object 165-1 on the web page 155.

Alternatively, in step 233, the performance monitoring process 145-2 determines an action performed by a user 108 based on at least one of:

i) a time stamp associated with the web page 155, or
 ii) an object handler associated with the web page 155.

In an example embodiment, the performance monitoring process 145-2 captures an event status of the web page 155 when the web page successfully downloads. The performance monitoring process 145-2 also captures a timestamp at the completion of the successful downloading of the web page 155. The performance monitoring process 145-2 also captures the next action taken by user 108, such as clicking on a hyperlink contained within the web page 155, and the timestamp associated with that action. The performance monitoring process 145-2 then calculates the 'user think time'. The 'user think time' is the time the user 108 spent on the web page 155 before taking another action (such as exiting the web page 155, moving to a new web page 155, etc.)

Alternatively, in step 234, the performance monitoring process 145-2 detects that an error occurred on the web page 155. For example, the performance monitoring process 145-2 may determine that a third party advertisement failed to successfully load, or the third party advertisement contained an invalid hyperlink.

In step 235, the performance monitoring process 145-2 identifies a level of reporting associated with monitoring of the web page 155. A web site owner may specify the amount of reporting the performance monitoring process 145-2 produces. For example, the web site owner may specify a reporting mode of 'summary', 'verbose', 'super verbose', etc.

Based on the error that occurred on the web page 155, in step 236, the performance monitoring process 145-2 modifies the level of reporting associated with monitoring of the web page 155. In an example embodiment, the web site owner specifies a reporting mode of 'summary'. Based on a type of error that occurred on the web page 155, the performance monitoring process 145-2 modifies the level of reporting from 'summary' to 'verbose', so as to provide the web site owner with additional error details that may help in the diagnosis of the error.

This above post-processing can take place after page termination, such as when the user instructs the browser to go to another page (via selection of a link, or a navigation operation), or can be done partly when the page load is complete, and other parts can be done on page termination.

FIG. 11 is a flowchart of the steps performed by the performance monitoring process 145-2 when it transfers the performance record to a remote server 150 for analysis of performance of web page 150 operation in the browser.

In step 237, the performance monitoring process 145-2 transfers the performance record to a remote server 150 for analysis of performance of web page 150 operation in the browser. In an example embodiment, the performance monitoring process 145-2 detects that a performance record has been created and the page is complete.

In step 238, the performance monitoring process 145-2 compares at least one characteristic associated with the performance record with a threshold that determines an acceptable performance record. In an example embodiment, the performance monitoring process 145-2 identifies appropriate levels of reporting, for example, based on an indicated sampling rate or verbosity level. Upon detecting that a performance record is available to transfer to the remote server 150, the performance monitoring process 145-2 compares a characteristic of the performance record with the identified appropriate level of reporting.

In step 239, the performance monitoring process 145-2 determines that at least one characteristic associated with the performance record exceeds the threshold. In an example embodiment, the performance monitoring process 145-2 determines that the level of performance records being transferred to the remote server 150 exceeds what has been established as being an appropriate level of reporting. In this embodiment then, performance data is always collected and produced, but the decision to send it to the remote server 150 is based on past history of how many times it has already been sent, which may be know to the performance monitoring process 145-2, or may be detect via communication with the remote server 150 or via cookie information, for example.

In step 240, the performance monitoring process 145-2 transmits an alert to the remote server 150. The alert indicates that the performance record exceeds the threshold. The performance monitoring process 145-2 notifies the remote server 150 when the level of performance monitoring has exceeded a predefined threshold.

In step 241, the performance monitoring process 145-2 discards the performance record. After notifying the remote server 150 that the level of performance monitoring has exceeded a predefined threshold, the performance monitoring process 145-2 discards the performance record. In other words, when an abnormal rate of data is produced, the performance monitoring process 145-2 notifies the remote server 150, and discards the data.

Figure 12:
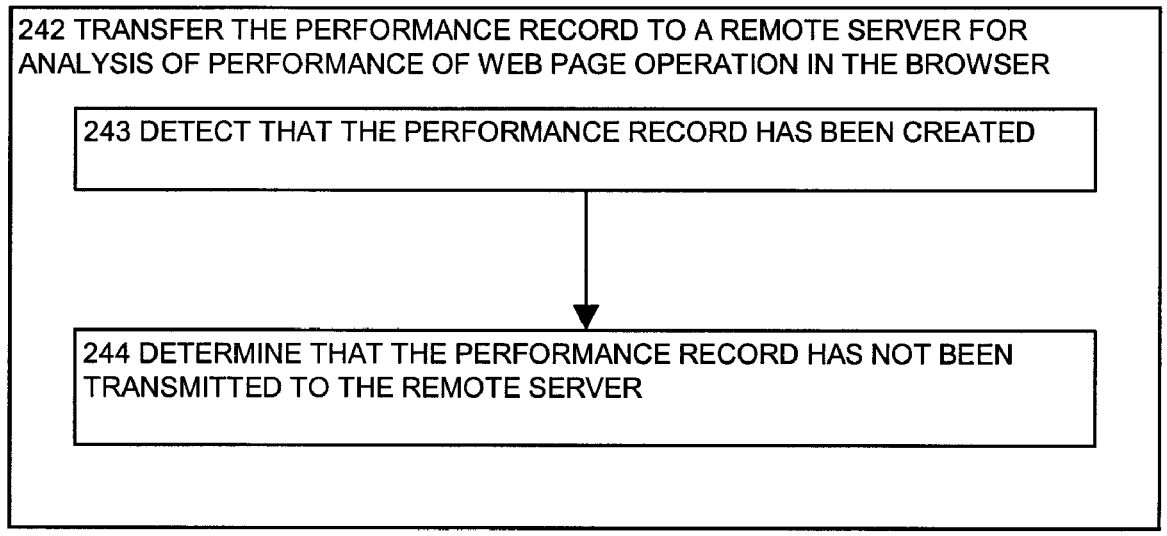
FIG. 12 illustrates a flowchart of a procedure performed by the system of FIG. 1 when the performance monitoring process transfers the performance record to a remote server for analysis of performance of web page operation in the browser, and detects that the performance record has been created, according to one embodiment disclosed herein.

FIG. 12 is a flowchart of the steps performed by the performance monitoring process 145-2 when it transfers the performance record to a remote server 150 for analysis of performance of web page 155 operation in the browser.

In step 242, the performance monitoring process 145-2 transfers the performance record to a remote server 150 for analysis of performance of web page operation in the browser. Upon creation of the performance record, the performance monitoring process 145-2 transfers the performance record to a remote server 150. A provider of the performance monitoring process 145-2 provides the web site owner with an analysis of the performance of the web page 155.

In step 243, the performance monitoring process 145-2 detects that the performance record has been created. In an example embodiment, a performance record is created by the performance monitoring process 145-2 upon receiving notification that the web page 155 has completed downloading. In another example embodiment, the performance monitoring process 145-2 determines that a user 108 clicked on a hyperlink within the downloading web page 155. The performance monitoring process 145-2 determines the loading of the web page 155 has been aborted by the user 108, and creates a performance record.

In step 244, the performance monitoring process 145-2 determines that the performance record has not been transmitted to the remote server 150, and transfers the performance record to the remote server. In an example embodiment, when the performance monitoring process 145-2 determines that performance record has been created, the performance monitoring process 145-2 detects whether the performance record has been transmitted to the remote server 150. If the performance record has not been transmitted to the remote server 150, the performance monitoring process 145-2 transmits the performance record.

While the system and method have been particularly shown and described with references to configurations thereof, it will be understood by those skilled in the art that various changes in form and details may be made therein without departing from the scope of embodiments disclosed herein encompassed by the appended claims. Accordingly, the present embodiments disclosed herein are not intended to be limited by the example configurations provided above.

What is claimed is:

1. A computer-implemented method for identifying performance of web page operation in a browser, the computer-implemented method comprising:
   determining if browser operation on a web page is subject to monitoring, the web page loaded for access by the browser, the web page including embedded code for executing a browser monitoring process, the browser executing the browser monitoring process as an initial operation that the browser performs on the web page;
   determining a level of monitoring to be performed on the browser operation, the level of monitoring selected from multiple predetermined levels of monitoring, each predetermined level of monitoring corresponding to an amount of data to record, the data associated with the browser operation on the web page;
   monitoring the browser operation on the web page to identify objects referenced by the web page, including monitoring a web page object model maintained by the browser as the browser parses the web page to identify objects referenced by the web page;
   for objects referenced by the web page, parsing the web page to identify objects subject to tracking and tracking a performance metric associated with each object;
   performing post-processing on the performance metrics of objects referenced by the web page to create a performance record for that web page post-processing being performed at the browser; and
   after creation of the performance record at the browser, transferring the performance record to a remote server for analysis of performance of web page operation in the browser.

2. The method computer-implemented of claim 1 wherein determining if the browser operation on the web page is subject to monitoring comprises:
   obtaining performance collection information from a computer system on which the browser is operating;
   transmitting the performance collection information to the remote server to determine if the computer system on which the browser is operating is subject to monitoring; and
   receiving a response from the remote server.

3. The computer-implemented method of claim 2 wherein receiving a response from the remote server comprises:
   identifying a filter; and
   receiving notification that performance collection information from the computer system has been compared against the filter to determine that the browser operation on the web page is subject to monitoring.

4. The computer-implemented method of claim 1 wherein determining if the browser operation on the web page is subject to monitoring comprises:
   determining the browser operation on the web page is subject to monitoring based on performance collection information residing on a computer system on which the browser is in operation;
   determining that the performance record has been transmitted to the remote server; and
   terminating the monitoring of the web page if the performance record has been transmitted.

5. The computer-implemented method of claim 1 wherein parsing the web page to identify objects subject to tracking the performance metric comprises:
- identifying objects including at least one of:
  - i) an image;
  - ii) a cascading style sheet identifier;
  - iii) a portion of executable code;
  - iv) a frame; or
  - v) a user identified tracking tag.

6. The computer-implemented method of claim 1 comprising:
- notifying an object handler that the parsing of the web page is completed, the object handler associated with an interface that allows access to the objects on the web page;
- receiving notification to terminate parsing the web page; and
- capturing a timestamp associated with the parsing of the web page.

7. The computer-implemented method of claim 6 wherein notifying the object handler that the parsing of the web page is completed comprises:
- detecting an event status associated with the web page, the event status including at least one of:
  - i) a successful download of the web page;
  - ii) an error incurred by the web page a download of the web page; and
  - iii) an aborted download of the web page.

8. The computer-implemented method of claim 1 wherein for objects referenced by the web page, tracking a performance metric associated with each object comprises:
- for each object referenced by the web page, adding an object handler to an interface that allows access to the objects on the web page.

9. The computer-implemented method of claim 8 wherein for each object referenced by the web page, adding the object handler comprises:
- creating an event status associated with the object; and
- capturing a timestamp for the event status associated with the object.

10. The computer-implemented method of claim 9 comprising:
- determining a status associated with the object based on an analysis of the event status and the timestamp, the status associated the object including at least one of:
  - i) cached;
  - ii) blocked;
  - iii) successfully downloaded;
  - iv) unsuccessfully downloaded; or
  - v) aborted.

11. The computer-implemented method of claim 1 wherein performing post-processing on the performance metrics of objects referenced by the web page to create a performance record for that web page comprises:
- obtaining at least one characteristic associated with the computer system on which the browser is in operation; and
- storing performance collection information on the computer system, the performance collection information including at least one of:
  - i) the at least one obtained characteristic associated with the computer system on which the browser is operating; and
  - ii) the performance record.

12. The computer-implemented method of claim 1 wherein performing post-processing on the performance metrics of objects referenced by the web page to create a performance record for that web page comprises:
- creating a graphical representation of the performance record at the browser; and
- providing a graphical user interface in which to render the graphical representation of the performance record.

13. The computer-implemented method of claim 1 wherein performing post-processing on the performance metrics of objects referenced by the web page to create a performance record for that web page comprises:
- calculating a load time associated with at least one of:
  - i) at least one object on the web page; and
  - ii) the web page.

14. The computer-implemented method of claim 1 wherein performing post-processing on the performance metrics of objects referenced by the web page to create a performance record for that web page comprises:
- determining an action performed by a user based on at least one of:
  - i) a time stamp associated with the web page; and
  - ii) an object handler associated with the web page.

15. The computer-implemented method of claim 1 wherein performing post-processing on the performance metrics of objects referenced by the web page to create a performance record for that web page comprises:
- detecting that an error occurred on the web page, the error indicating that the web page did not properly load at the browser;
- identifying a level of reporting associated with monitoring of the web page, the level of reporting indicating how much detail to collect and process from the web page; and
- in response to detecting that the error occurred on the web page, modifying the level of reporting associated with monitoring of the web page by increasing an amount of data associated with the performance metrics that is included in the performance record.

16. The computer-implemented method of claim 1 wherein transferring the performance record to a remote server for analysis of performance of web page operation in the browser comprises:
- comparing at least one characteristic associated with the performance record with a threshold that determines an acceptable performance record;
- determining the at least one characteristic associated with the performance record exceeds the threshold;
- transmitting an alert to the remote server, the alert indicating that the performance record exceeds the threshold; and
- discarding the performance record without transferring the performance record to the remote server.

17. The method computer-implemented of claim 1 wherein transferring the performance record to a remote server for analysis of performance of web page operation in the browser comprises:
- detecting that the performance record has been created; and
- determining that the performance record has not been transmitted to the remote server.

18. A computer readable medium encoded with computer programming logic that when executed on a process in a computerized device monitors performance, the medium comprising:
- instructions for determining if browser operation on a web page is subject to monitoring, the web rage loaded for access by the browser, the web race including embedded code for executing a browser monitoring process, the browser executing the browser monitoring process as an initial operation that the browser performs on the web page;

instructions for determining a level of monitoring to be performed on the browser operation, the level of monitoring selected from multiple predetermined levels of monitoring, each predetermined level of monitoring corresponding to an amount of data to record, the data associated with the browser operation on the web page;

instructions for monitoring the browser operation on the web page to identify objects referenced by the web page, including monitoring a web page object model maintained by the browser as the browser parses the web page to identify objects referenced by the web page;

for objects referenced by the web page, instructions for parsing the web page to identify objects subject to tracking and instructions for tracking a performance metric associated with each object;

instructions for performing post-processing on the performance metrics of objects referenced by the web page to create a performance record for that web page, post-processing being performed at the browser; and instructions for transferring the performance record to a remote server for analysis of performance of web page operation in the browser, transferring occurring after creation of the performance record at the browser.

19. A computerized device comprising:

a memory;

a processor;

a communications interface;

an interconnection mechanism coupling the memory, the processor and the communications interface;

wherein the memory is encoded with an performance monitoring application that when executed on the processor is capable of monitors performance on the computerized device by performing the operations of:

determining if browser operation on a web page is subject to monitoring, the web page loaded for access by the browser, the web page including embedded code for executing a browser monitoring process, the browser executing the browser monitoring process as an initial operation that the browser performs on the web page;

determining a level of monitoring to be performed on the browser operation, the level of monitoring selected from multiple predetermined levels of monitoring, each predetermined level of monitoring corresponding to an amount of data to record, the data associated with the browser operation on the web page;

monitoring the browser operation on the web page to identify objects referenced by the web page, including monitoring a web page object model maintained by the browser as the browser parses the web page to identify objects referenced by the web page;

for objects referenced by the web page, parsing the web page to identify objects subject to tracking and tracking a performance metric associated with each object;

performing post-processing on the performance metrics of objects referenced by the web page to create a performance record for that web page, post-processing being performed at the browser; and after creation of the performance record at the browser, transferring the performance record to a remote server for analysis of performance of web page operation in the browser.

20. The computer-implemented method of claim 1 wherein performing post-processing on the performance metrics of objects referenced by the web page to create a performance record for that web page further comprises:

detecting that an error occurred on the web page, the error indicating that an object subject to tracking was not properly rendered at the browser;

identifying a level of reporting associated with monitoring of the web page, the level of reporting indicating an amount of performance metrics to collect;

based on the error that occurred on the web page, modifying the level of reporting associated with monitoring of the web page to increase the level of reporting and to include additional data associated with the error to assist in diagnosing the error; and wherein transferring the performance record to a remote server for analysis of performance of web page operation in the browser comprises:

comparing at least one characteristic associated with the performance record with a threshold that determines an acceptable performance record;

determining the at least one characteristic associated with the performance record exceeds the threshold; and transmitting an alert to the remote server, the alert indicating that the performance record exceeds the threshold.

21. The computer-implemented method of claim 20 wherein performing post-processing on the performance metrics of objects referenced by the web page to create a performance record for that web page further comprises:

calculating a load time associated with at least one object on the web page;

determining an action performed by a user based on a time stamp associated with the web page determining an action performed by a user based an object handler associated with the web page obtaining at least one characteristic associated with the computer system on which the browser is in operation; and storing performance collection information on the computer system, the performance collection information including the performance record.

22. The computer-implemented method of claim 1, wherein performing post-processing on the performance metrics at the browser includes:

determining a viewable screen area representing an amount of the web page that is visible within a browser interface on a graphical user monitor; and determining when all page objects references within the viewable screen area have completed loading to identify a performance metric that represents an amount of time from web page access to a time when the web page can be perceived as loaded.

23. The computer-implemented method of claim 22, wherein performing post-processing on the performance metrics includes:

creating a timeline of events and a time duration of those events as part of creating the performance record before transferring to the remote server; and displaying the timeline including displaying which objects loaded on the web page and an order in which the objects were loaded on the web page.

24. The computer-implemented method of claim 1, wherein performing post-processing on the performance metrics of objects referenced by the web page to create a performance record for that web page comprises:
- detecting that an error occurred on the web page, the error indicating that the browser did not properly render an object subject to tracking; and
- in response to the error that occurred in the web page, modifying the predetermined level of monitoring to a different predetermined level of monitoring that increases the amount of data included in the performance record.

25. The computer-implemented method of claim 24, wherein transferring the performance record to the remote server for analysis of performance of web page operation in the browser comprises:
- transferring a first performance record upon completion of page loading; and
- transferring a second performance record in response to identifying that user activity on the page is complete.

* * * * *

UNITED STATES PATENT AND TRADEMARK OFFICE
CERTIFICATE OF CORRECTION

PATENT NO. : 7,765,295 B2
APPLICATION NO. : 11/877804
DATED : July 27, 2010
INVENTOR(S) : Paul Anastas et al.

It is certified that error appears in the above-identified patent and that said Letters Patent is hereby corrected as shown below:

Claim 18, Column 20, line 63, after "the web," delete "rage".
Claim 18, Column 20, line 63, after "the web" insert -- page --.
Claim 18, Column 20, line 64, after "the web," delete "race".
Claim 18, Column 20, line 64, after "the web" insert -- page --.

Signed and Sealed this
First Day of February, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,765,295 B2 | Page 1 of 1 |
| APPLICATION NO. | : 11/877804 | |
| DATED | : July 27, 2010 | |
| INVENTOR(S) | : Paul Anastas et al. | |

It is certified that error appears in the above-identified patent and that said Letters Patent is hereby corrected as shown below:

Claim 2, Column 18, line 39, after "The," delete "method computer-implemented".
Claim 2, Column 18, line 39, after "The" insert -- computer-implemented method --.
Claim 17, Column 20, line 50, after "The" delete "method computer-implemented".
Claim 17, Column 20, line 50, after "The" insert -- computer-implemented method --.

Signed and Sealed this
Eighth Day of March, 2011

David J. Kappos
*Director of the United States Patent and Trademark Office*